(12) United States Patent
Suzuki et al.

(10) Patent No.: US 10,643,515 B2
(45) Date of Patent: May 5, 2020

(54) DISPLAY DRIVER, DISPLAY DEVICE AND METHOD OF OPERATING DISPLAY DRIVER

(71) Applicant: Synaptics Japan GK, Nakano, Tokyo (JP)

(72) Inventors: Kentaro Suzuki, Tokyo (JP); Atsushi Shikata, Tokyo (JP); Jiro Shimbo, Tokyo (JP); Makoto Takeuchi, Tokyo (JP); Shigeru Ota, Tokyo (JP)

(73) Assignee: Synaptics Japan GK, Tokyo (JP)

( * ) Notice: Subject to any disclaimer, the term of this patent is extended or adjusted under 35 U.S.C. 154(b) by 0 days.

(21) Appl. No.: 16/137,119

(22) Filed: Sep. 20, 2018

(65) Prior Publication Data

US 2019/0096309 A1 Mar. 28, 2019

(30) Foreign Application Priority Data

Sep. 22, 2017 (JP) .................................. 2017-182756

(51) Int. Cl.
*G06F 3/041* (2006.01)
*G09G 3/20* (2006.01)
*G09G 3/04* (2006.01)

(52) U.S. Cl.
CPC ............. *G09G 3/20* (2013.01); *G06F 3/0412* (2013.01); *G06F 3/0416* (2013.01); *G09G 3/2092* (2013.01); *G09G 2300/0408* (2013.01); *G09G 2300/0842* (2013.01); *G09G 2310/0202* (2013.01); *G09G 2310/08* (2013.01); *G09G 2370/08* (2013.01)

(58) Field of Classification Search
CPC .. G06F 3/041–0416; G09G 3/20–2092; G09G 2300/0408–0842; G09G 2310/0202–08; G09G 5/001
See application file for complete search history.

(56) References Cited

U.S. PATENT DOCUMENTS

| 2006/0170710 | A1* | 8/2006 | Chao ....................... G09G 5/005 345/660 |
| 2007/0001983 | A1* | 1/2007 | Ito ......................... G09G 3/3688 345/98 |
| 2007/0127847 | A1* | 6/2007 | Aoki .................... H04N 1/3871 382/298 |
| 2008/0165201 | A1* | 7/2008 | Anai ..................... G09G 3/2092 345/559 |
| 2014/0049533 | A1* | 2/2014 | Saitoh ...................... G09G 3/20 345/213 |
| 2014/0253536 | A1* | 9/2014 | Honda .................... G06F 3/044 345/213 |
| 2014/0292688 | A1* | 10/2014 | Munechika ............ G09G 5/001 345/173 |

FOREIGN PATENT DOCUMENTS

JP 2014203102 A 10/2014

\* cited by examiner

*Primary Examiner* — Lin Li
(74) *Attorney, Agent, or Firm* — Patterson + Sheridan, LLP

(57) ABSTRACT

A display driver includes: a memory comprising a plurality of memory regions each configured to store image data for one line of an image displayed in a frame; and control circuitry configured to adjust a number of in-use memory regions of the plurality of memory regions used to store the image data. The control circuitry is further configured to control the memory so that image data for respective lines of the image are cyclically stored in the in-use memory regions in a fixed order.

18 Claims, 9 Drawing Sheets

N: NUMBER OF MEMORY REGIONS 20 IN MEMORY 12

DISPLAY DRIVER, DISPLAY DEVICE AND METHOD OF OPERATING DISPLAY DRIVER

CROSS REFERENCE

This application claims priority to Japanese Patent Application No. 2017-182756, filed on Sep. 22, 2017, the disclosure of which is incorporated herein by reference in its entirety.

TECHNICAL FIELD

The present disclosure relates to a display driver which includes a memory temporarily storing image data therein.

BACKGROUND

A display driver configured to drive a display panel such as a liquid crystal display panel and an OLED (organic light emitting diode) display panel may incorporate a memory configured to temporarily store image data therein. When a display panel is adapted to touch sensing, the memory may allow acquiring time sufficient for completing touch sensing.

Since a memory tends to occupy a large circuit size, a display driver may be designed to reduce the capacity of a memory integrated therein. Accordingly, a display driver may incorporate a memory having a capacity that is insufficient for storing image data associated with all the lines of an image displayed in each frame. When the number of lines of the image displayed in each frame, that is, the vertical resolution of the image is M, a display driver may incorporate a memory having a capacity for storing image data of only N lines, more specifically, a memory including N line memories or N memory regions each storing an image data of one line, where N<M. In this case, the N memory regions may be cyclically used in a wraparound manner to temporarily store image data therein corresponding to an image displayed in each frame (see JP 2014-203102 A).

SUMMARY

In one embodiment, a display driver includes: a memory comprising a plurality of memory regions each configured to store image data for one line of an image displayed in a frame; and control circuitry configured to adjust a number of in-use memory regions of the plurality of memory regions that are used to store image data, and control the memory so that image data for respective lines of the image are cyclically stored in the in-use memory regions in a fixed order.

In another embodiment, a display device comprises: a display panel; and a display driver comprising: a memory comprising a plurality of memory regions, each of the plurality of memory regions configured to store image data for one line of an image displayed in a frame; control circuitry configured to adjust a number of in-use memory regions of the plurality of memory regions that are used to store the image data, and control the memory so that image data for respective lines of the image are cyclically stored in the in-use memory regions in a fixed order; and drive circuitry configured to receive the image data stored in the memory, and drive the display panel based on the image data.

In another embodiment, a method of operating a display driver comprising a memory comprising a plurality of memory regions each of the plurality of memory regions configured to store image data for one line of an image displayed in a frame, the method comprising: adjusting a number of in-use memory regions of the plurality of memory regions that are used to store the image data; and controlling the memory so that image data for respective lines of the image are cyclically stored in the in-use memory regions in a fixed order.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only some embodiments of this disclosure and are therefore not to be considered limiting of its scope, for the disclosure may admit to other equally effective embodiments.

DETAILED DESCRIPTION

Figure 1:
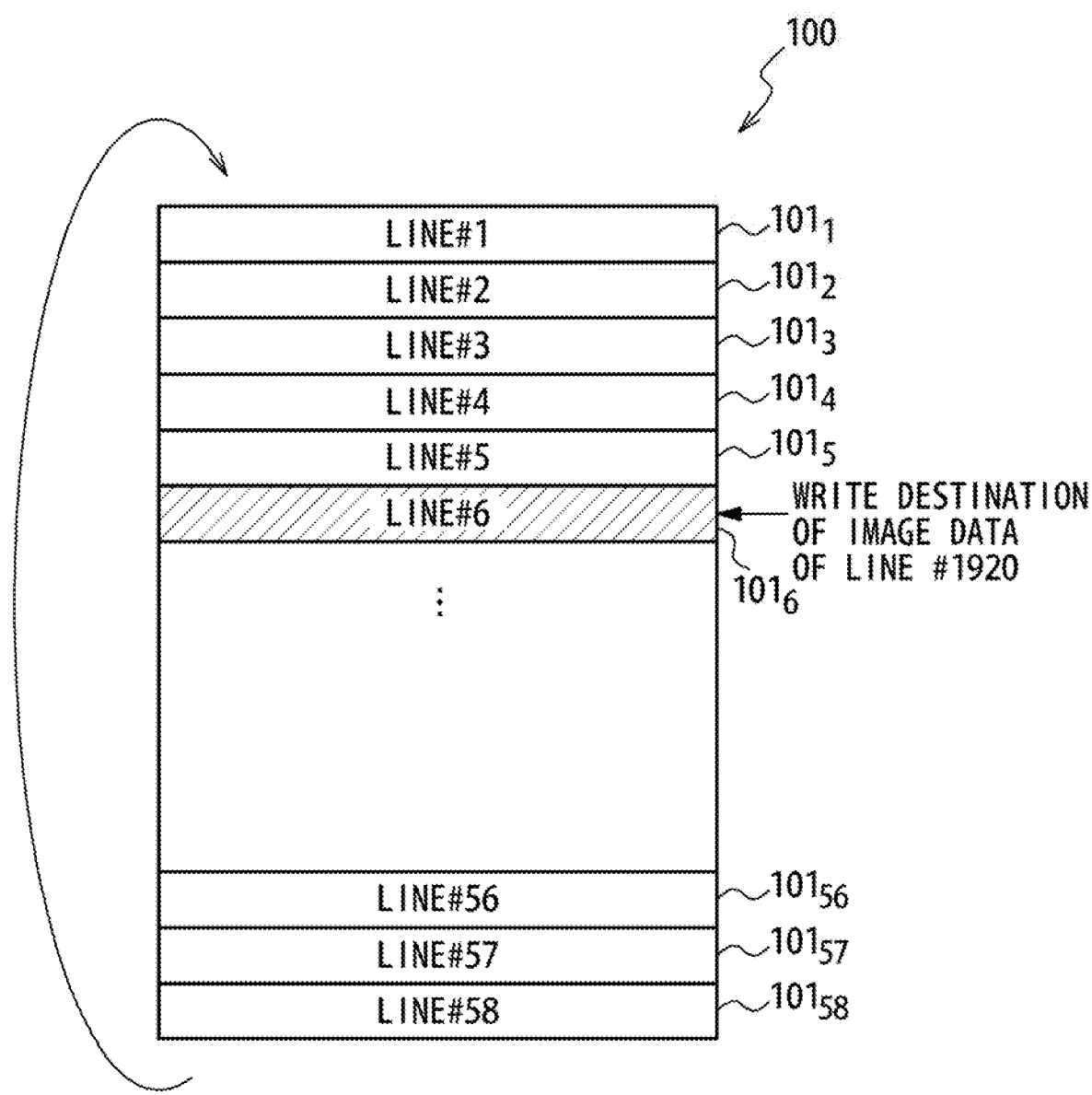
FIG. 1 illustrates one example of the configuration and operation of a memory configured to store image data therein.

In the following, various embodiments of the present disclosure will be described with reference to attached drawings. In the following, same components may be denoted by same reference numbers. Suffixes may be attached to reference numerals for distinguishing multiple same components from one another.

A description is first given of image data writing and reading from and into a memory in a display driver, when the memory has a capacity that is insufficient for storing image data of all the lines of an image displayed in each frame. Described in the following is one example in which the vertical resolution of the image displayed in each frame is M lines and the display driver incorporates a memory 100 including N memory regions 101 each having a capacity for storing an image data of one line, as illustrated in FIG. 1. Illustrated in FIG. 1 is an example in which M is 1920 and N is 58. The N memory regions 101 are cyclically used to store the image data associated with an image to be displayed in a frame of interest.

A display driver, on which strong restrictions in terms of the circuit size and the cost are imposed, is designed to perform a simple access control to the memory 100. Accordingly, the order of writing image data into the N memory regions 101 of the memory may be fixed over frames. In the example illustrated in FIG. 1, the image data of the first line (line #1) of the image displayed in each frame is written into the memory region $101_1$, and the image data of the second line is written into the memory region $101_2$. Similarly, the image data of the third to $58^{th}$ lines are written into the memory regions $101_3$ to $101_{58}$, respectively. Subsequently, the image data of the $59^{th}$ to $106^{th}$ lines are written into the memory regions $101_1$ to $101_{58}$, respectively. A similar process is applied to the image data of the remaining lines. Each memory region 101 is allowed to store image data of multiple lines of the image displayed in each frame. Such operation can be easily achieved by resetting the write address used to select the memory regions 101 into which image data are to be written in the memory 100, that is, setting the write address to an initial value, when each frame is started. The reading of image data and driving of the display panel in response to the read-out image data are performed in parallel to the writing of image data.

When the N memory regions 101 are cyclically used to store image data of the image displayed in each frame, the timing at which a new image data is written into each memory region 101 is determined as being later than the reading of the image data which has been previously stored in the memory region 101 to drive pixel circuits of the corresponding line. Otherwise, image data may be improperly overwritten, which may result in that an improper image is displayed on the display panel.

Figure 2:
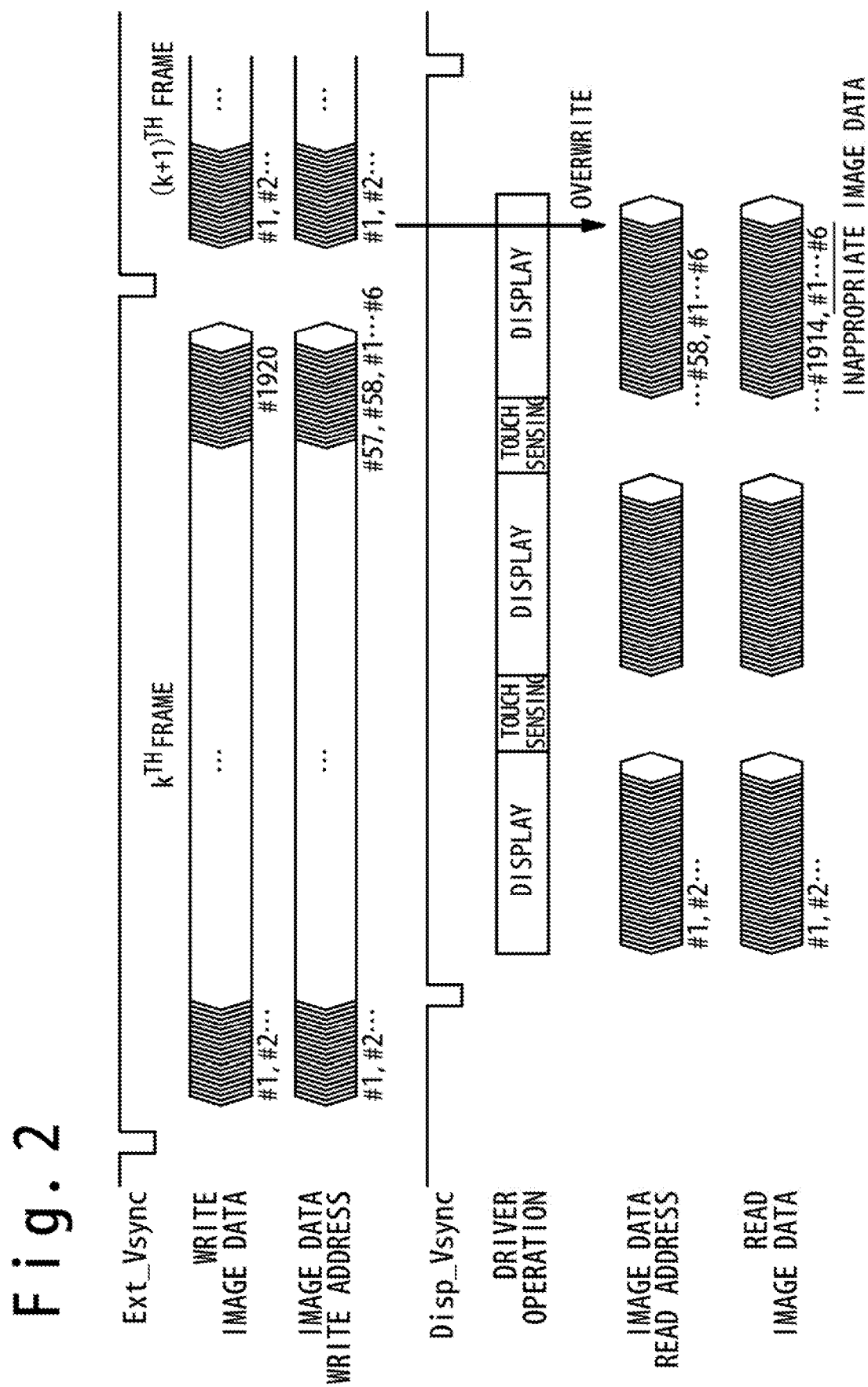
FIG. 2 is a timing chart illustrating one example of the operation of a display driver incorporating the memory illustrated in FIG. 1.

FIG. 2 illustrates an example in which the write timing of image data is improperly set for the case when the memory 100 includes 58 memory regions $101_1$ to $101_{58}$ and the vertical resolution M of the image displayed in each frame is 1920. The legend "Ext_Vsync" denotes a vertical sync signal generated in a host which supplies image data to the display driver and the legend "Disp_Vsync" denotes a vertical sync signal generated in the display driver.

When the vertical sync signal Ext_Vsync is asserted in the host and image data of an image to be displayed in a $k^{th}$ frame, which may be simply referred to as the "image data of the $k^{th}$ frame", hereinafter, are supplied from the host to the display driver, the image data of the $k^{th}$ frame are sequentially written into the memory 100. The legends "#1" to "#1920" of the section entitled "write image data" indicate image data of lines #1 to #1920, respectively, and the legends "#1" to "#58" of the section entitled "image data write address" indicate the memory regions 101 into which the image data are to be written; these legends respectively indicate that the image data are written into the memory regions $101_1$ to $101_{58}$.

The destinations of the respective image data are selected so that the memory regions $101_1$ to $101_{58}$ are cyclically used. In detail, the image data of lines #1 to #58 are written into the memory regions $101_1$ to $101_{58}$, respectively, and the image data of lines #59 to #116 are written into the memory regions $101_1$ to $101_{58}$, respectively. The image data of the remaining lines are similarly written into the memory regions $101_1$ to $101_{58}$.

The remainder when 1920 is divided by 58 is 6, and accordingly the image data of the final six lines of the image displayed in each frame, that is, the image data of lines #1915 to #1920 are stored in the memory regions $101_1$ to $101_6$, respectively. As illustrated in FIG. 1, the image data of the final line #1920 of the image displayed in each frame is stored in the memory region $101_6$.

Referring back to FIG. 2, when the vertical sync signal Ext_Vsync is then asserted again, image data of the $(k+1)^{th}$ frame are supplied to the display driver from the host. The image data of the $(k+1)^{th}$ frame are sequentially written into the memory 100. Similarly to those of the $k^{th}$ frame, the image data of lines #1 to #58 of the $(k+1)^{th}$ frame are written into the memory regions $101_1$ to $101_{58}$, respectively,.

If the writing of the image data of the $(k+1)^{th}$ into the memory 100 is started too early, the image data of the final line and its neighboring lines of the image displayed in the $k^{th}$ frame are undesirably overwritten before the reading thereof is completed. In the example illustrated in FIG. 2, the image data of the final six lines of the image displayed in the $k^{th}$ frame are written into the memory regions $101_1$ to $101_6$, respectively. In connection with this, the image data of the first six lines of the image displayed in the $(k+1)^{th}$ frame are also written into the memory regions $101_1$ to $101_6$, respectively. This implies that there is a restriction that the writing of the image data of lines #1 to #6 of the image displayed in each frame is to be performed after the reading of the final six lines #1915 to #1920 of the image displayed in the previous frame.

The above-described restriction imposed on the write timing and read timing can be relaxed by adjusting the number of memory regions 101 used to store image data in accordance with the vertical resolution. More specifically, the start timing of writing of image data of each frame can be made earlier than the completion timing of reading of image data of the previous frame.

Figure 3:
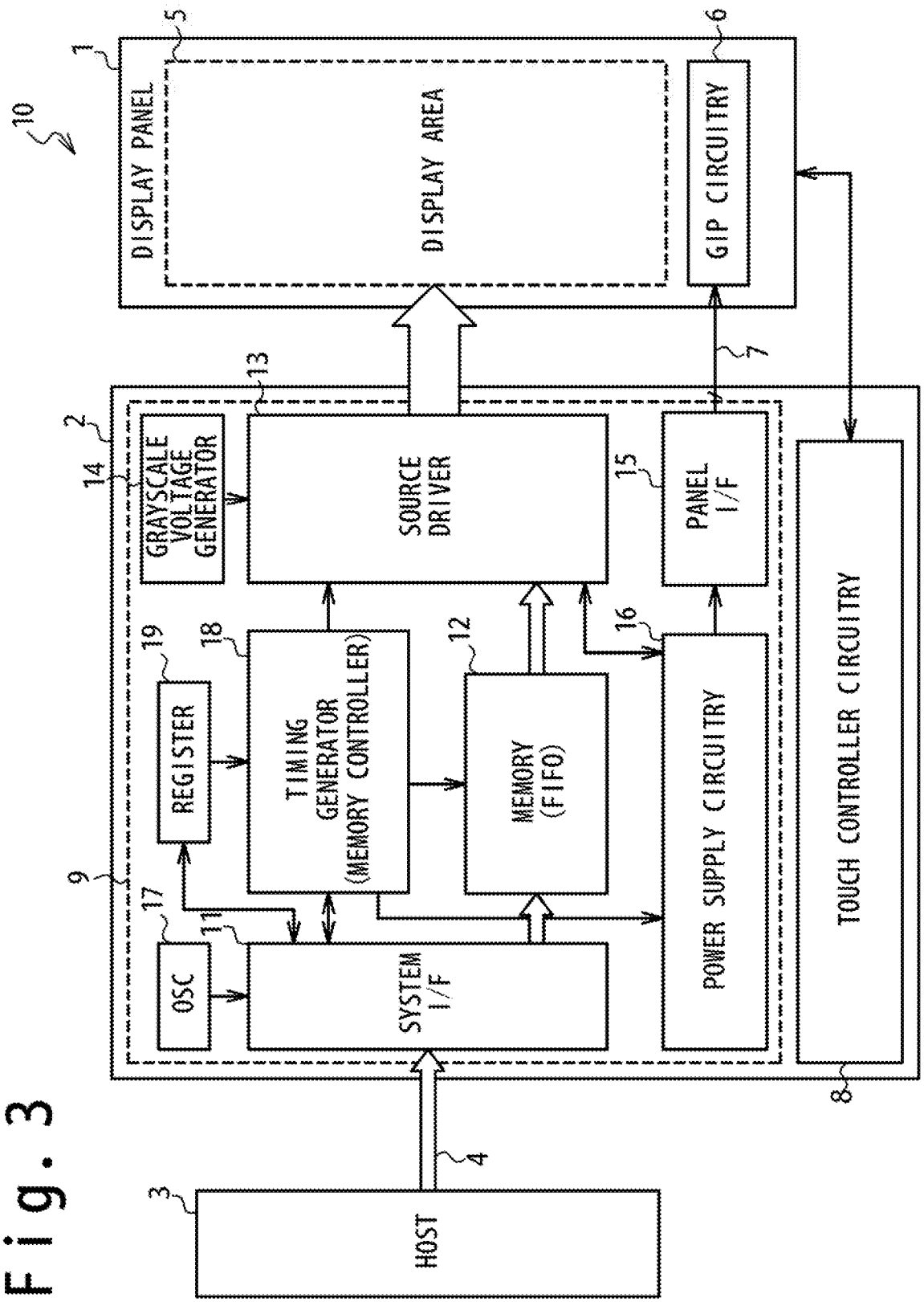
FIG. 3 is a block diagram illustrating the configurations of a display driver and a display device incorporating the same in one or more embodiments.

In one or more embodiments, as illustrated in FIG. 3, a display device 10 includes a display panel 1 and a touch controller-embedded display driver 2. The display device 10 is configured to display an image corresponding to an image data 4 received from the host 3 on the display panel 1. A liquid crystal display panel or an OLED (organic light emitting diode) display panel may be used as the display panel 1. Hereinafter, the touch controller-embedded display driver 2 is simply referred to as the "display driver 2".

The display panel 1 includes a display area 5 and GIP (gate-in-panel) circuitry 6.

Arranged in the display area 5 are a plurality of source lines, which are also referred to as signal lines, a plurality of gate lines, which are also referred to as scan lines, and pixel circuits disposed at intersections of the source lines and gate lines. Note that the source lines, the gate lines and the pixel circuits are not illustrated in FIG. 3. Each pixel circuit is connected to a corresponding source line and gate line. When an image is displayed, the gate lines are sequentially selected. Drive voltages generated in accordance with grayscale values described in the image data are written into pixel circuits connected to the selected gate line via the source lines. This allows driving the respective pixel circuits in the display area 5 in accordance with the grayscale values to display an image in the display area 5.

The GIP circuitry 6 is configured to drive the gate lines arranged in the display area 5 in response to gate control signals 7 received from the display driver 2.

In one or more embodiments, the display panel 1 incorporates touch sensing electrodes used for touch sensing, that is, sensing of contact of a conductor with the display panel 1. When self-capacitance touch sensing is performed, the self-capacitances of the respective touch sensing electrodes are detected and the touch sensing is performed on the basis of the detected self-capacitances. When mutual capacitance touch sensing is performed, drive electrodes are integrated in the display panel 1 and the mutual capacitances formed between the drive electrodes and the touch sensing electrodes are detected. The mutual capacitance touch sensing is performed on the basis of the detected mutual capacitances.

In an alternative embodiment, a touch panel in which touch sensing electrodes are formed may be placed on the display panel 1.

The display driver 2 includes touch controller circuitry 8 and display driver circuitry 9. In one or more embodiments, the touch controller circuitry 8 and the display driver circuitry 9 may be integrated in a single chip. Alternatively, the touch controller circuitry 8 and the display driver circuitry 9 may be integrated in separate chips.

The touch controller circuitry 8 is configured to perform touch sensing on the basis of the capacitances of the touch sensing electrodes disposed in the display panel 1 or disposed in a touch panel placed on the display panel, more specifically, the self-capacitances of the touch sensing electrodes and/or the mutual capacitances formed between the drive electrodes and the touch sensing electrodes.

The display driver circuitry 9 includes a system interface 11, a memory 12, source driver circuitry 13, grayscale voltage generator circuitry 14, panel interface circuitry 15, power supply circuitry 16, oscillator circuitry 17, a timing generator 18 and register circuitry 19.

The system interface 11 is configured to communicate with the host 3 to exchange various data used to control the display driver 2. More specifically, the system interface 11 is configured to receive image data 4 from the host 3 and forward the received image data 4 to the memory 12. The system interface 11 also receives various control data for controlling the display driver 2 from the host 3. The control data include commands for controlling the operation of the display driver 2 and register values to be stored in the register circuitry 19. In one or more embodiments, the register values stored in the register circuitry 19 include a register value corresponding to or indicative of the vertical resolution of the display panel 1. The control data include a vertical sync packet which instructs start of a vertical sync period in the display driver 2 and a horizontal sync packet which instructs start of a horizontal sync period.

The memory 12 is configured to receive the image data 4 from the system interface 11 and temporarily store the same therein. The image data 4 stored in the memory 12 are read out at desired timing and supplied to the source driver circuitry 13 to drive the display panel 1.

The source driver circuitry 13 operates as drive circuitry configured to drive the source lines in the display area 5 of the display panel 1 in response to the image data received from the memory 12. In detail, the source driver circuitry 13 receives a set of grayscale voltages having voltage levels respectively corresponding to allowed grayscale values of the image data from the grayscale voltage generator circuitry 14 and perform digital-analog conversion on the image data by using the received grayscale voltages to generate drive voltages to be supplied to the respective source lines. The generated drive voltages are supplied to the respective pixel circuits in the display area 5 via the source lines to thereby drive the respective pixel circuits of the display panel 1.

The grayscale voltage generator circuitry 14 is configured to generate the set of grayscale voltages used for the digital-analog conversion in the source driver circuitry 13 and supply the same to the source driver circuitry 13.

The panel interface circuitry 15 is configured to generate gate control signals in response to the control data received from the host 3, and supply the generated gate control signals to the GIP circuitry 6 of the display panel 1.

The power supply circuitry 16 is configured to supply power supply voltages to the source driver circuitry 13 and the panel interface circuitry 15.

The oscillator circuitry 17 is configured to supply clock signals to various circuitries integrated in the display driver 2. In FIG. 3, only a dot clock supplied to the system interface 11 is illustrated as an arrow.

The timing generator 18 is configured to perform timing control of various circuitries integrated in the display driver 2, including the source driver circuitry 13, the panel interface circuitry 15 and the power supply circuitry 16. In this embodiment, the timing generator 18 also has the function of control circuitry which performs control of the memory 12, including generation of a write address and a read address.

The register circuitry 19 is configured to store therein commands and register values used for the control of the display driver 2. Commands and register values included in control data received from the host 3 are stored in the register circuitry 19.

Figure 4:
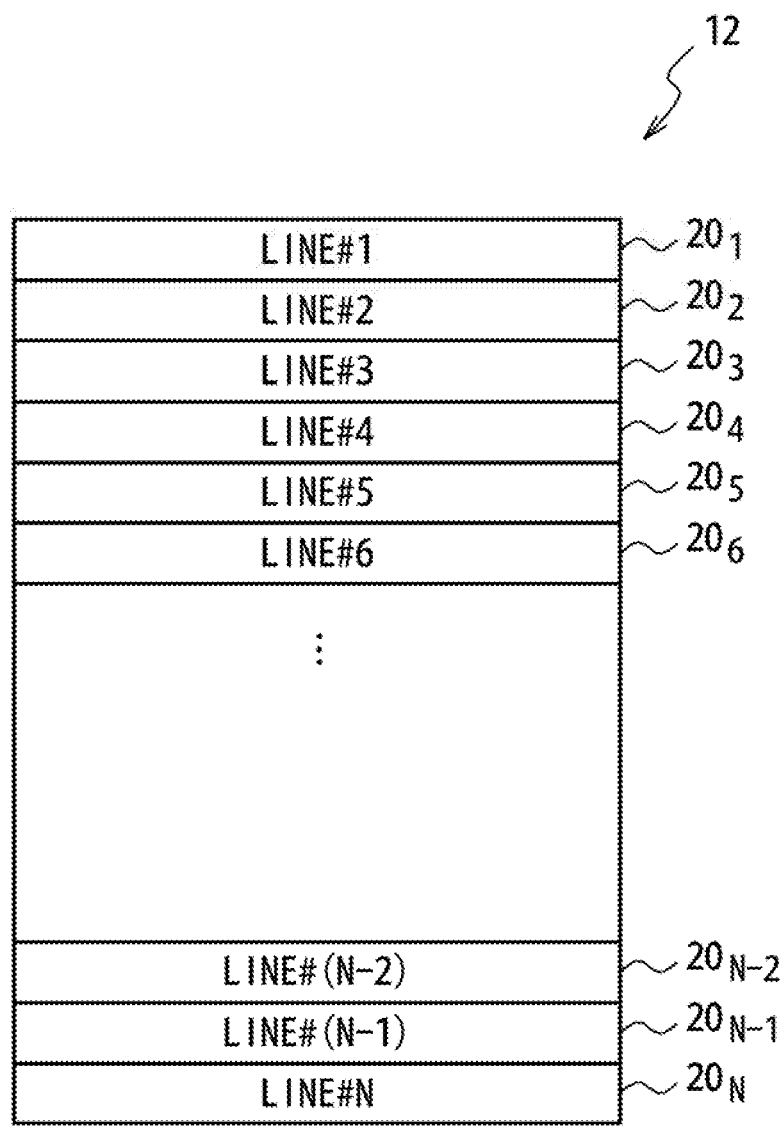
FIG. 4 illustrates one example of the configuration of a memory.

In one or more embodiments, as illustrated in FIG. 4, the memory 12 includes N memory regions $20_1$ to $20_N$. Each memory region 20 is configured as a line memory having a capacity for storing an image data of one line of an image displayed in each frame, and therefore the memory 12 has a capacity of storing image data of N lines as a whole. It should be noted however that the number of the memory regions 20 is smaller than the vertical resolution M of the image displayed in each frame. The memory 12 has a capacity that is insufficient for storing image data of all the lines of the image displayed in each frame.

In one or more embodiments, all of the N memory regions $20_1$ to $20_N$ are not necessary used for storing the image data as will be described later in detail. In one or more embodiments, the number of memory regions 20 used to store image data is variable depending on the vertical resolution M of the image displayed in each frame, that is, the number of lines of the image displayed in each frame. In the following, the number of memory regions 20 used to store image data is referred to as N_inuse, where N_inuse is an integer from one to N.

When the number of memory regions 20 used to store image data is N_inuse, the memory regions $20_1$ to $20_{N\_inuse}$ out of the N memory regions 20 are used to store image data of an image displayed in each frame. The image data of respective lines of the image displayed in each frame are sequentially forwarded from the system interface 11 to the memory 12, and stored cyclically in the memory regions $20_1$ to $20_{N\_inuse}$ in a wraparound manner.

In detail, the image data of the first line #1 of the image displayed in each frame is stored in the memory region $20_1$. The image data of the second line #2 is stored in the memory region $20_2$, and the image data of the third line #3 is stored in the memory region $20_3$. Correspondingly, the image data of lines #4 to #N_inuse are stored in the memory regions $20_4$ to $20_{N\_inuse}$, respectively. Furthermore, the image data of line #(N_inuse+1) to #(2×N_inuse) are stored in the $20_1$ to $20_{N\_inuse}$, respectively, and the image data of line #(2×N_inuse+1) to #(3×N_inuse) are stored in the $20_1$ to $20_{N\_inuse}$, respectively. A similar goes for the image data of the remaining lines. In general, the image data of the $i^{th}$ line #i is stored in the memory region $20_{N\_inuse}$ when i is divisible by N_inuse, and stored in the memory region $20_{Ri}$ when i is not divisible by N_inuse, where Ri is the remainder when i is divided by N_inuse.

Figure 5:
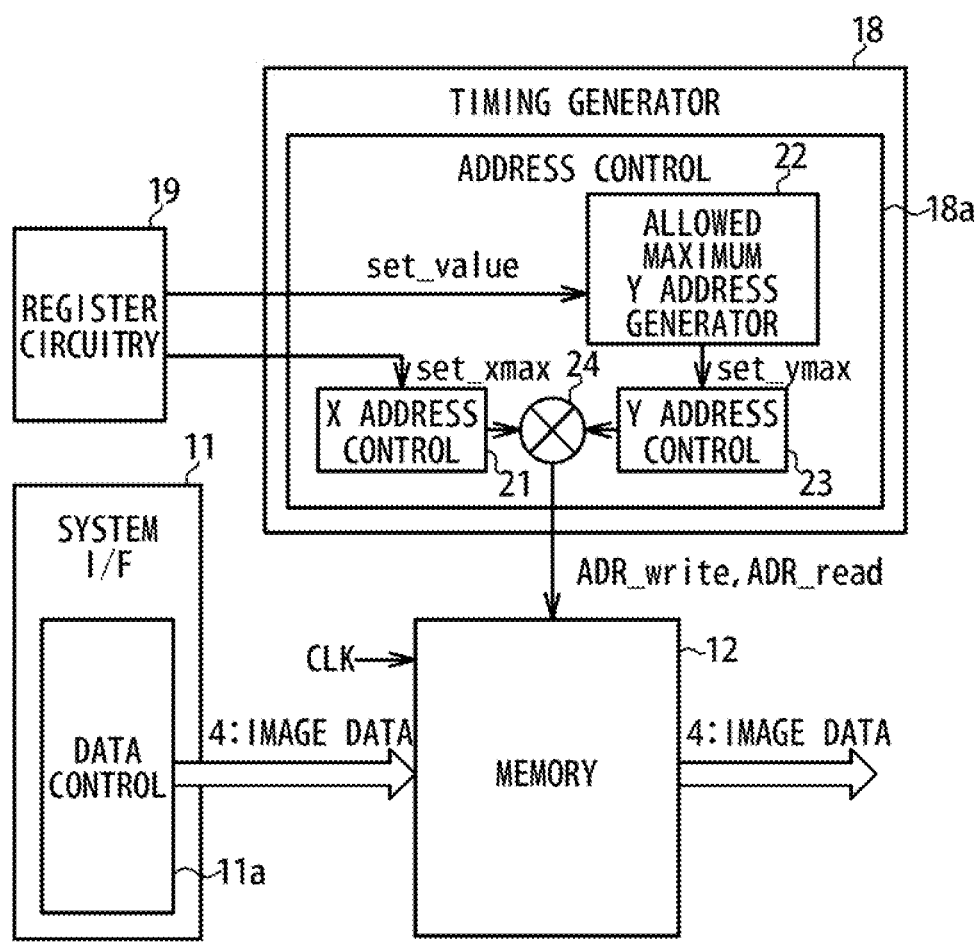
FIG. 5 is a block diagram illustrating an exemplary configuration of circuitry related to memory control.

FIG. 5 illustrates the configuration of circuitry related to control of the memory 12. The system interface 11 includes data control circuitry 11a configured to forward image data 4 received from the host 3 to the memory 12. The timing generator 18 includes address control circuitry 18a configured to control the write address and read address of the memory 12.

The address control circuitry 18a is configured to generate a write address ADR_write and a read address ADR_read of the memory 12. The write address ADR_write includes an X address and a Y address, where the Y address of the write address ADR_write selects a memory region 20 to which an image data is to be written from among the N memory regions 20 included in the memory 12, and the X address specifies the memory cell to which each bit of the image data are to be written in the selected memory region 20. Similarly, the read address ADR_read includes an X address and a Y address, where the Y address of the read address ADR_read selects a memory region 20 from which an image data is to be read out, from among the N memory regions 20 included in the memory 12, and the X address specifies the memory cell from which each bit of the image data are to be read out in the selected memory region 20.

In this embodiment, the address control circuitry 18a includes X address control circuitry 21, allowed maximum Y address generator circuitry 22, Y address control circuitry 23 and address supply circuitry 24.

The X address control circuitry 21 is configured to generate X addresses of a write address ADR_write and a read address ADR_read. A parameter value set_xmax which specifies the allowed maximum X address is stored in the register circuitry 19, and the X address control circuitry 21 determines the X addresses of the write address ADR_write and the read address ADR_read as a value equal to or less than the parameter value set_xmax. Since an X address specifies the memory cell of the selected memory region 20 to which a bit of the image data is to be written or specifies the memory cell from which a bit of the image data is to be read out as described above, the parameter value set_xmax, which specifies the allowed maximum X address, is used to specify memory cells used to store an image data for each memory region 20.

The allowed maximum Y address generator circuitry 22 generates a parameter value set_ymax which specifies the allowed maximum Y address. Since the Y address selects one of the N memory regions 20 to which an image data is to be written or selects one of the N memory regions 20 from which an image data is to be read out, the parameter value set_ymax, which specifies the allowed maximum Y address, is also used to specify the number of memory regions 20 used to store image data.

The Y address control circuitry 23 is configured to generate Y addresses of a write address ADR_write and a read address ADR_read. The Y address control circuitry 23 determines the Y addresses of the write address ADR_write and the read address ADR_read as a value equal to or less than the parameter value set_ymax received from the allowed maximum Y address generator circuitry 22.

The address supply circuitry 24 supplies the write address ADR_write and the read address ADR_read to the memory 12. The memory 12 is configured to write an image data received from the system interface 11 into the write destination specified by the write address ADR_write, and supply to the source driver circuitry 13 the image data read out from the read source specified by the read address ADR_read.

Figure 6:
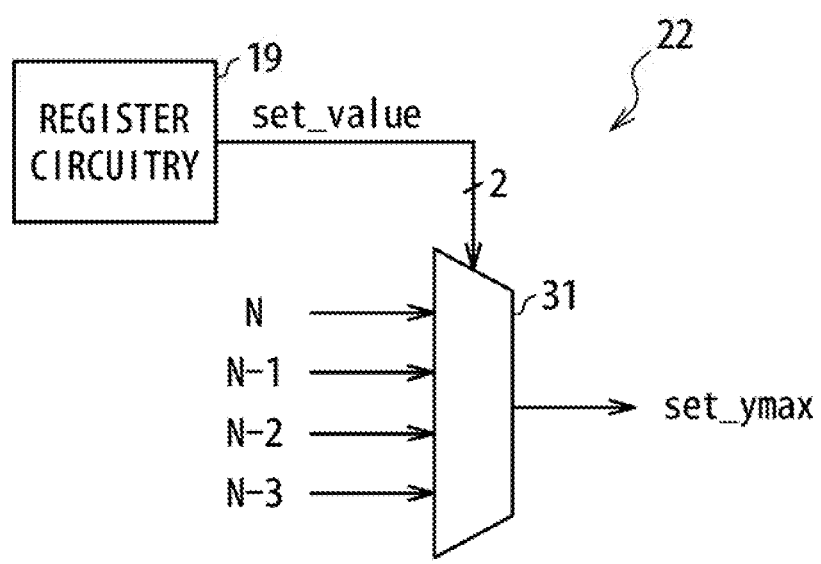
FIG. 6 is a block diagram illustrating an exemplary configuration of allowed maximum Y address generator circuitry.

FIG. 6 illustrates the configuration of the allowed maximum Y address generator circuitry 22 in one or more embodiments. In one or more embodiments, the register value set_value is stored in the register circuitry 19, and the allowed maximum Y address generator circuitry 22 is configured to generate the parameter value set_ymax, which specifies the allowed maximum Y address, in accordance with the register value set_value. The register value set_value is set as a value corresponding to the vertical resolution M of the image displayed on the display panel 1 in each frame. This implies that the allowed maximum Y address generator circuitry 22 is configured to generate the parameter value set_ymax, which specifies the allowed maximum Y address, in accordance with the vertical resolution M.

In one or more embodiment, the parameter value set_ymax specifies the number N_inuse of memory regions 20 used to store image data out of the N memory regions 20, and therefore N_inuse is determined depending on the vertical resolution M. As discussed later in detail, this operation effectively relaxes the restriction imposed on the write timing and read timing of image data.

In the configuration illustrated in FIG. 5, the allowed maximum Y address generator circuitry 22 includes a selector 31 configured to select the parameter value set_ymax, which specifies the allowed maximum Y address, in response to the register value set_value. In one or more embodiments, the register value set_value is a two-bit value and the selector 31 selects the parameter value set_ymax from values of N, N−1, N−2 and N−3, in response to the register value set_value, where N is the number of memory regions 20 included in the memory 12. Accordingly, the allowed maximum Y address generator circuitry 22 selects the number of memory regions 20 used to store image data from among N, N−1, N−2 and N−3, in response to the register value set_value.

In one or more embodiments, the selector 31 sets the parameter value set_ymax to N, N−1, N−2 and N−3, when the register value set_value is "0", "1", "2" and "3", respectively. The parameter value set_ymax determined by the allowed maximum Y address generator circuitry 22 is supplied to the Y address control circuitry 23 and used to generate the Y address of the write address ADR_write and read address ADR_read in the Y address control circuitry 23.

It should be noted that the values N, N−1, N−2 and N−3 supplied to the inputs of the selector 31 are possible candidates of the number of memory regions 20 used to store image data. The possible candidates of the number of memory regions 20 used to store image data are not limited to the values N, N−1, N−2 and N−3. In view of the fact that as many memory regions 20 as possible are basically used to provide a sufficiently long touch sensing period, however, the possible candidates of the number of memory regions 20 used to store image data, that is, the values inputted to the selector 31 are determined as values from N−m to N, In one or more embodiments, where m is an integer equal to or more than one. This allows selecting the number of memory regions 20 used to store image data from integers from N−m to N, increasing the number of the used memory regions 20 as much as possible.

A description is then given of the operation of the display device 10 in this embodiment. Discussed below is an example in which the vertical resolution M of an image displayed in each frame on the display panel 1 is 1920 lines and the number of the memory regions 20 included in the memory 12 is 58. In this case, N is 58 and accordingly the selector 31 selects the number of memory regions 20 used to store image data from 58, 57, 56 and 55.

The restriction of the write timing and read timing of image data can be effectively relaxed by properly selecting the remainder when M is divided by N_inuse, which is the number of memory regions 20 used to store image data, where M is the vertical resolution.

As described above, when the vertical resolution M of the image displayed in each frame is 1920 and all of the 58 memory regions 20 are used to store image data, that is, N=N_inuse=58, the remainder when M is divided by N_inuse is 6. In this case, image data of the final six lines #1915 to #1920 of the image displayed in each frame are stored in the memory regions $20_1$ to $20_6$, into which image data of the first six lines #1 to #6 of the image displayed in each frame are stored. In this case, the writing of the image data of the first six lines of the image displayed in each frame should be started after the reading of the image data of the final six lines of the image displayed in the previous frame.

When the display driver 2 is set so that 57 memory regions $20_1$ to $20_{57}$ of the 58 memory regions 20 are actually used to store image data of an image displayed in each frame, that is, when N_inuse=57, the writing of an image data of the first line of an image displayed in each frame can be started earlier. Such setting can be achieved by setting the register value set_value to "1", which allows the selector 31 to select the value of 57 (=N−1) as the parameter value set_ymax.

Figure 7:
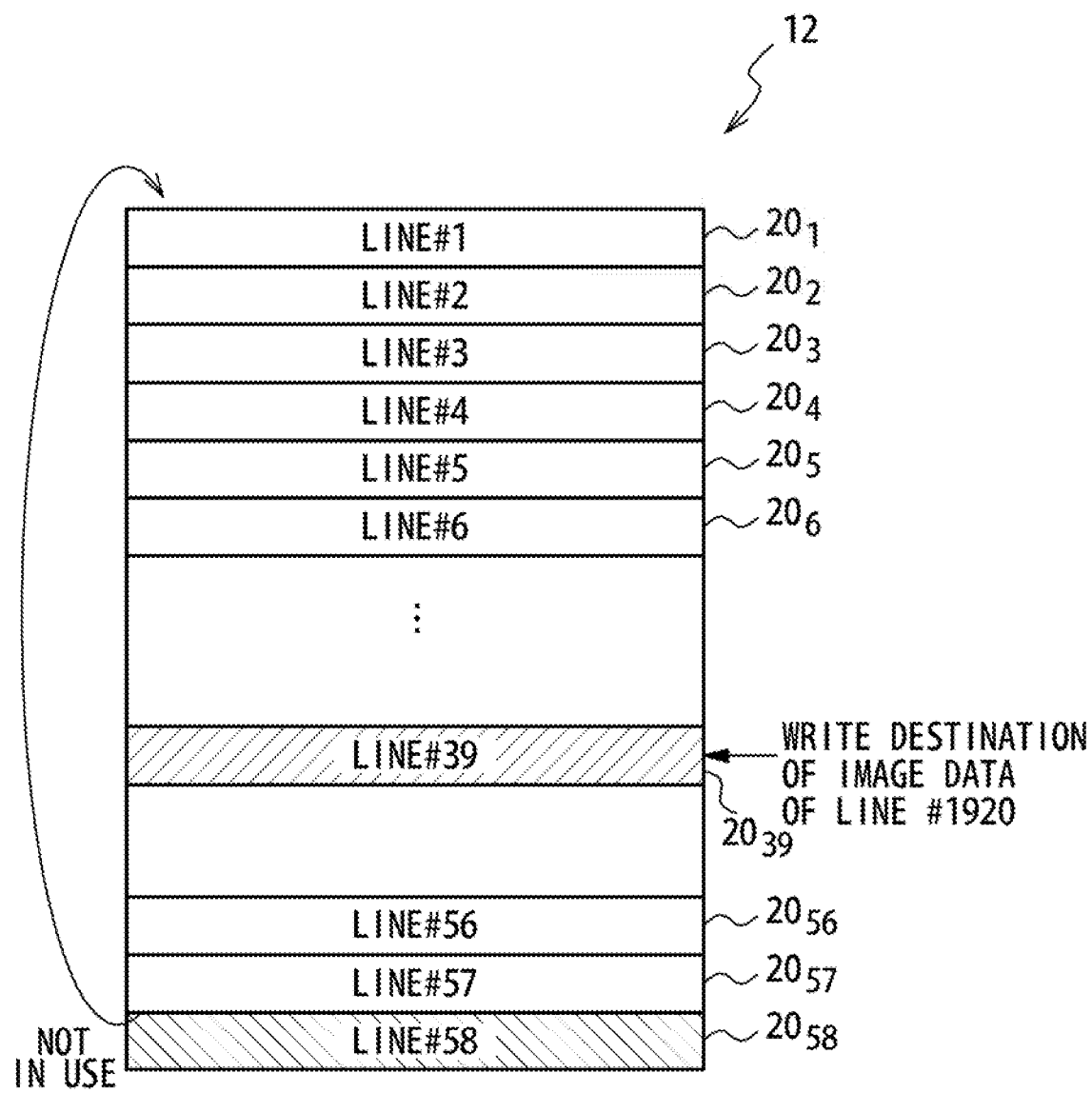
FIG. 7 illustrating one example of the operation of the memory.

As illustrated in FIG. 7, the remainder when the vertical resolution M (=1920) of the image displayed in each frame is divided by the number N_inuse (=57) of the memory regions 20 used to store image data is 39. Accordingly, the image data of the last line #1920 of the image displayed in each frame is written into the memory region $20_{39}$. In this case, the writing of the first line of the image displayed in each frame is allowed to be started much earlier than the reading of the image data of the final line and its neighboring lines of the image displayed in the previous frame.

Figure 8:
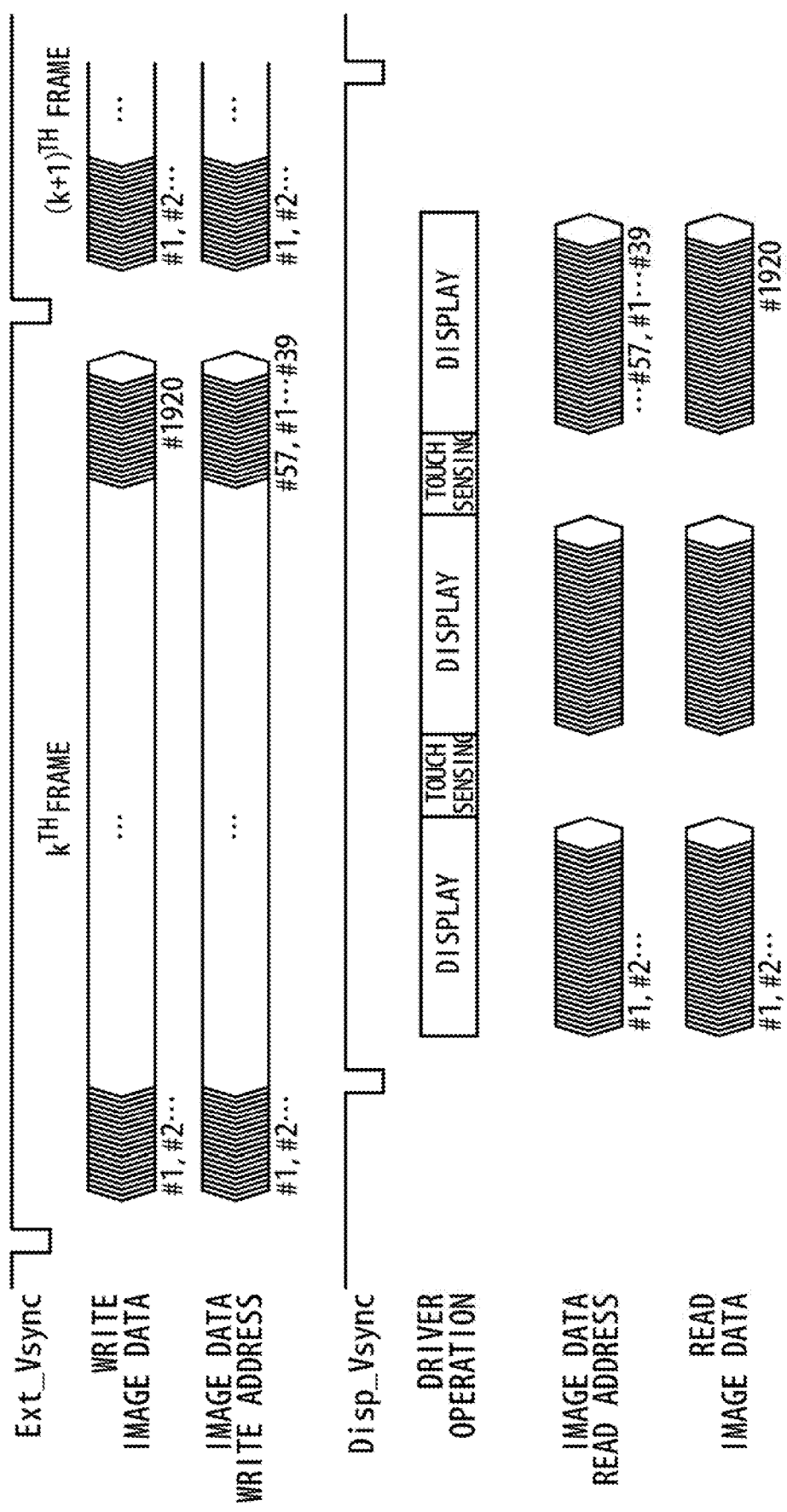
FIG. 8 is a timing chart illustrating one example of the operation of the display driver.

In the timing chart illustrated in FIG. 8, "Ext_Vsync" denotes the vertical sync signal generated in the host 3, and "Disp_Vsync" denotes the vertical sync signal generated in the display driver 2. The vertical sync signal Ext_Vsync defines frames, that is, vertical sync periods in the host 3, and the vertical sync signal Disp_Vsync defines frames in the display driver 2. In each frame defined in the host 3, the host 3 transmits to the display driver 2 image data of an image to be displayed in each frame. In each frame defined in the display driver 2, the display driver 2 displays an image in response to the image data received from the host 3. The vertical sync signal Disp_Vsync generated in the display driver 2 is synchronous with the vertical sync signal Ext_Vsync generated in the host 3; however, the timing at which the vertical sync signal Disp_Vsync is asserted, in FIG. 8, pulled down to the low level, is delayed from the timing at which the vertical sync signal Ext_Vsync is asserted.

The host 3 supplies to the display driver 2 image data of an image to be displayed on the display panel 1 in each frame defined in the host 3. Illustrated in FIG. 8 is the operation in which the host 3 supplies image data of images to be displayed in the $k^{th}$ frame and the $(k+1)^{th}$ frame.

In the meantime, in each frame defined in the display driver 2, the display driver 2 displays an image on the display panel 1 in response to the image data supplied from the host 3, and performs touch sensing using the touch sensing electrodes disposed in the display panel 1. In the operation illustrated in FIG. 8, each frame of the display driver 2 includes three display periods and two touch sensing periods. A display period is a period during which selected pixel circuits of the display area 5 of the display panel 1 are driven by the source driver circuitry 13 and a touch sensing period is a period during which touch sensing is performed by the touch controller circuitry 8. Each touch sensing period is disposed between two adjacent display periods.

In detail, when the vertical sync signal Ext_Vsync is asserted in the host 3 and the image data of the image of the $k^{th}$ frame are supplied from the host 3 to the display driver 2, the image data of the image of the $k^{th}$ frame are sequentially written into the memory 12. The legends "#1" to "#1920" in the column entitled "write image data" in FIG. 8 indicate the image data of lines #1 to #1920. The legends "#1" to "#57" in the column entitled "image data write address" indicate the memory regions 20 into which the image data are written, illustrating that image data are written into the memory regions $20_1$ to $20_{57}$.

The write destinations of the image data of the respective lines are selected by the write address ADR_write so that the memory regions $20_1$ to $20_{57}$ are cyclically used. In detail, the image data of lines #1 to #57 are written into the memory regions $20_1$ to $20_{57}$, respectively, and the image data of lines #58 to #114 are written into the memory regions $20_1$ to $20_{57}$, respectively. The image data of the remaining lines are similarly written into the memory regions $20_1$ to $20_{57}$. In general, the image data of the $i^{th}$ line #i is stored in the memory region $20_{57}$ when i is divisible by 57, and stored in the memory region $20_{Ri}$ when i is not divisible by 57, where Ri is the remainder when i is divided by 57.

As is understood from the fact that the remainder when 1920 is divided by 57 is 39, the image data of the final 39 lines #1882 to #1920 of the image displayed in each frame are stored in the memory regions $20_1$ to $20_{39}$, respectively. Note that the image data of the final line #1920 of the image displayed in each frame is stored in the memory region $20_{39}$, as illustrated in FIG. 7.

In parallel to the writing of the image data, the image data of lines #1 to #1920 of the $k^{th}$ frame stored in the memory regions $20_1$ to $20_{57}$ of the memory 12 are sequentially read out and the display panel 1 is driven in response to the image data read out. The read source of the image data is specified by the read address ADR_read. The image data of the $i^{th}$ line #i is read out from the memory region $20_{57}$ when i is divisible by 57, and read out from the memory region $20_{Ri}$ when i is not divisible by 57, where Ri is the remainder when i is divided by 57.

When the vertical sync signal Ext_Vsync is asserted again in the host 3, image data of the $(k+1)^{th}$ frame are supplied to the display driver 2. The image data of the $(k+1)^{th}$ frame are sequentially written into the memory 12. Similarly to the image data of the $k^{th}$ frame, the image data of lines #1 to #57 of the $(k+1)^{th}$ frame are written into the memory regions $20_1$ to $20_{57}$, respectively.

In the operation illustrated in FIG. 8, the reading of the image data of line #1882 of the image displayed in the $k_{th}$ frame, which is stored in the memory region $20_1$, is performed considerably earlier than the reading of the image data of the final line #1920. Accordingly, the image data of the first line #1 of the image displayed in the $(k+1)^{th}$ frame is allowed to be written considerably earlier than the reading of the image data of the final line #1920 of the image displayed in the $k^{th}$ frame.

As described above, the display driver 2 is adapted to select the parameter value set_ymax, which specifies the allowed maximum Y address, that is, the number N_inuse of the memory regions 20 used to store image data, by the register value set_value stored in the register circuitry 19. This configuration allows properly selecting the number N_inuse of the memory regions 20 used to store image data in response to switching of the vertical resolution of an image displayed on the display panel 1 and thereby relaxing the restriction imposed on the write timing and read timing of image data.

When switching the vertical resolution, for example, the host 3 may rewrite the register value set_value stored in the register circuitry 19 via the system interface 11 in accordance with desired vertical resolution.

The number N_inuse of the memory regions 20 used to store image data may be determined through the procedure described below, for example.

Multiple possible candidates of the number N_inuse of the memory regions 20 used to store image data are first selected. The selected potential candidates are referred to as $N_{\#1}$ to $N_{\#p}$, hereinafter, where p is an integer of two or more. The possible candidates $N_{\#1}$ to $N_{\#p}$ are integers different from each other and one of the possible candidates $N_{\#1}$ to $N_{\#p}$ is equal to N, which is the number of the memory regions 20 included in the memory 12.

The possible candidates $N_{\#1}$ to $N_{\#p}$ of the number of the memory regions 20 used to store image data are selected so as to provide a touch sensing period of sufficient time duration, regardless of which of the possible candidates is selected as N_inuse. In view of providing a touch sensing period of sufficient time duration, the possible candidates $N_{\#1}$ to $N_{\#p}$ are selected as large numbers as possible. In one or more embodiments, the possible candidates $N_{\#1}$ to $N_{\#p}$ may be N−p+1 to N, respectively.

The remainder when M is divided by each of the possible candidates $N_{\#1}$ to $N_{\#p}$ is calculated. The remainder when M is divided by the possible candidate $N_{\#i}$ is referred to as $R_{\#i}$, hereinafter, where i is an integer from one to p.

When the vertical resolution M is divisible by N_inuse, that is, the remainder when M is divided by N_inuse is 0, the image data of the final line #M of the image displayed in each frame is stored in the final memory region $20_{N\_inuse}$ used, and therefore the writing of image data of the image displayed in each frame is allowed to be started earlier.

Accordingly, when the vertical resolution M is divisible by $N_{\#i}$ for any i, the possible candidate $N_{\#i}$ is selected as N_inuse, which is the number of the memory regions 20 used to store image data. When the vertical resolution M is divisible by multiple possible candidates $N_{\#i}$, the largest one of the multiple possible candidates $N_{\#i}$ may be selected as N_inuse.

When the vertical resolution M is not divisible by N_inuse, the write timing of image data in each frame can be made earlier as the remainder increases. Accordingly, the possible candidate $N_{\#i}$ for which the remainder $R_{\#i}$ when the vertical resolution M is divided by $N_{\#i}$ is the largest is selected as N_inuse.

Discussed below is a first example in which the vertical resolution M is 1920 lines, the number N of the memory regions 20 included in the memory 12 is 58, and the number p of the possible candidates of the number N_inuse of the memory regions 20 used to store image data is 4. The four possible candidates $N_{\#1}$, $N_{\#2}$, $N_{\#3}$ and $N_{\#4}$ are 58 (=N), 57 (=N−1), 56 (=N−2) and 55 (=N−3), respectively.

The remainders $R_{\#1}$, $R_{\#2}$, $R_{\#3}$ and $R_{\#4}$ when the vertical resolution M is divided by the possible candidates $N_{\#1}$, $N_{\#2}$, $N_{\#3}$ and $N_{\#4}$ are 6, 39, 16 and 50, respectively, and the remainder $R_{\#4}$ is the largest. In this case, the possible candidates $N_{\#4}$ (=55) is selected as N_inuse. The register value set_value stored in the register circuitry 19 is set so that N_inuse is the possible candidate $N_{\#4}$. When the allowed maximum Y address generator circuitry 22 illustrated in FIG. 6 is used, N_inuse can be set to 55 by setting the register value set_value to "3". The register value set_value to the register circuitry 19 may be set by the host 3.

Discussed below is a second example in which the vertical resolution M is 2280 lines, the number N of the memory regions 20 included in the memory 12 is 58, and the number p of the possible candidates of the number N_inuse of the memory regions 20 used to store image data is 4. Also in this case, the four possible candidates $N_{\#1}$, $N_{\#2}$, $N_{\#3}$ and $N_{\#4}$ are 58 (=N), 57 (=N−1), 56 (=N−2) and 55 (=N−3), respectively.

In the second example, the remainders $R_{\#1}$, $R_{\#2}$, $R_{\#3}$ and $R_{\#4}$ when the vertical resolution M is divided by the possible candidates $N_{\#1}$, $N_{\#2}$, $N_{\#3}$ and $N_{\#4}$, respectively, are 18, 0, 40 and 25, respectively. The vertical resolution M (=2280) is divisible by the possible candidate $N_{\#2}$ (=57). In this case, the possible candidate $N_{\#2}$ is selected as N_inuse. The register value set_value stored in the register circuitry 19 is set so that N_inuse is the possible candidate $N_{\#2}$. When the allowed maximum Y address generator circuitry 22 illustrated in FIG. 6 is used, N_inuse can be set to 57 by setting the register value set_value to "1". The register value set_value may be set to the register circuitry 19 by the host 3.

The selection of the number N_inuse of the memory regions 20 used to store image data may be achieved by hardware of the display driver 2, such as the allowed maximum Y address generator circuitry.

Figure 9:
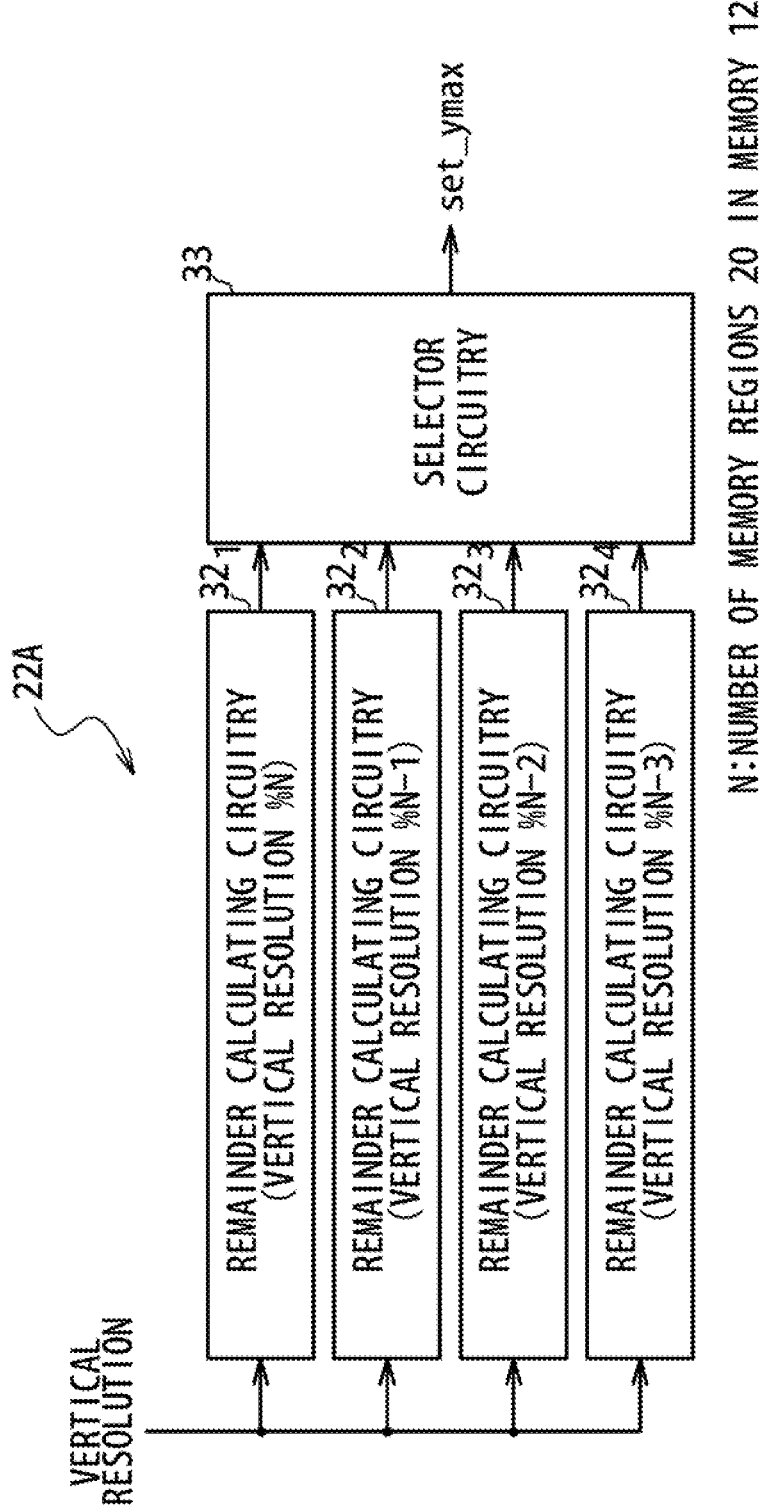
FIG. 9 is a block diagram illustrating another exemplary configuration of allowed maximum Y address generator circuitry.

FIG. 9 illustrates an example of the configuration of allowed maximum Y address generator circuitry 22A configured to select N_inuse on the basis of the vertical resolution M. When the allowed maximum Y address generator circuitry 22A is used, a vertical resolution parameter describing the vertical resolution M of an image displayed in each frame is stored in the register circuitry 19, and the vertical resolution parameter is supplied to the allowed maximum Y address generator circuitry 22A. The allowed maximum Y address generator circuitry 22A generates the parameter value set_ymax, which specifies the allowed maximum Y address, from the vertical resolution parameter. Since the number N_inuse of the memory regions 20 used to store image data is determined by the parameter value set_ymax, the allowed maximum Y address generator circuitry 22A accordingly operates as circuitry configured to select the number N_inuse of the memory regions 20 used to store image data on the basis of the vertical resolution M.

The allowed maximum Y address generator circuitry 22A includes remainder calculating circuitries $32_1$ to $32_4$ and selector circuitry 33. The allowed maximum Y address generator circuitry 22A illustrated in FIG. 9 is adapted to the case when the possible candidates of N_inuse are N, N−1, N−2 and N−3.

The possible candidates of N_inuse are set to the remainder calculating circuitries $32_1$ to $32_4$, respectively. In one or more embodiments, N, N−1, N−2 and N−3 are set to the remainder calculating circuitries $32_1$ to $32_4$, respectively, as the possible candidates of N_inuse.

Each of the remainder calculating circuitries $32_1$ to $32_4$ calculates the remainder when the vertical resolution M indicated by the vertical resolution parameter is divided by the possible candidate set thereto. In detail, the remainder calculating circuitry $32_1$ calculates the remainder when M is divided by N, and the remainder calculating circuitry $32_2$ calculates the remainder when M is divided by N−1. Similarly, the remainder calculating circuitry $32_3$ calculates the remainder when M is divided by N−2, and the remainder calculating circuitry $32_4$ calculates the remainder when M is divided by N−3.

The selector circuitry 33 is configured to select the parameter value set_ymax which specifies the allowed maximum Y address, that is, the number N_inuse of the memory regions 20 used to store image data, on the basis of the remainders calculated by the remainder calculating circuitries $32_1$ to $32_4$. The procedure in which N_inuse is selected by the selector circuitry 33 is as described above. When the vertical resolution M is divisible by any one of N, N−1, N−2 and N−3, the one by which the vertical resolution M is divisible is selected as N_inuse. When the vertical resolution M is divisible by none of N, N−1, N−2 and N−3, the one for which the remainder is the largest is selected as N_inuse. The selector circuitry 33 generates the parameter value set_ymax in accordance with the selected N_inuse.

Use of the allowed maximum Y address generator circuitry 22A allows the display driver 2 to properly select the number N_inuse of the memory regions 20 used to store image data in accordance with the vertical resolution M.

Although various embodiments of the present disclosure have been specifically described, a person skilled in the art would appreciate that technologies disclosed in the present disclosure may be implemented with various modifications.

What is claimed is:

1. A display driver, comprising:
a memory comprising a plurality of memory regions, each of the plurality of memory regions configured to store image data for one line of an image displayed in a frame; and
control circuitry configured to:
adjust a number of in-use memory regions of the plurality of memory regions that are used to store the image data by dividing a vertical resolution of the image by one or more candidates and selecting a candidate of the one or more candidates corresponding to a largest remainder, wherein each of the one or more candidates is associated with a different number of the plurality of memory regions; and
control the memory so that image data for respective lines of the image are cyclically stored in the in-use memory regions in a fixed order.

2. The display driver according to claim 1, wherein the control circuitry is further configured to:
calculate remainders by dividing the vertical resolution of the image by the one or more candidates; and
select, based on the calculated remainders, the candidate corresponding to the largest remainder.

3. The display driver according to claim 2, wherein selecting the candidate corresponding to the largest remainder comprises:
when none of the calculated remainders is 0, selecting the number of the in-use memory regions as one of the one or more candidates for which the calculated remainder is the largest.

4. The display driver according to claim 1, wherein a number of the plurality of memory regions is less than the vertical resolution of the image.

5. The display driver according to claim 1, further comprising register circuitry configured to store a register value, wherein adjusting the number of in-use memory regions is further based on the register value.

6. The display driver according to claim 5, wherein the register value corresponds to the vertical resolution of the image.

7. A display device, comprising:
a display panel; and
a display driver comprising:
a memory comprising a plurality of memory regions, each of the plurality of memory regions configured to store image data for one line of an image displayed in a frame;
control circuitry configured to:
adjust a number of in-use memory regions of the plurality of memory regions that are used to store the image data by dividing a vertical resolution of the image by one or more candidates and selecting a candidate of the one or more candidates corresponding to a largest remainder, wherein each of the one or more candidates is associated with a different number of the of memory regions; and
control the memory so that image data for respective lines of the image are cyclically stored r the in-use memory regions in a fixed order; and
drive circuitry configured to receive the image data stored in the memory and drive the display panel based on the image data.

8. The display device according to claim 7, wherein the control circuitry is further configured to:
calculate remainders by dividing the vertical resolution of the image is by the one or more candidates; and
select, based on the calculated remainders, the candidate corresponding to the largest remainder.

9. The display device according to claim 8, wherein selecting the candidate corresponding to the largest remainder comprises:
when none of the calculated remainders is 0, selecting the number of the in-use memory regions as one of the one or more candidates for which the calculated remainder is the largest.

10. The display device according to claim 7, wherein a number of the plurality of memory regions is less than the vertical resolution of the image.

11. The display device according to claim 7, further comprising register circuitry configured to store a register value,
wherein adjusting the number of in-use memory, regions is further based on the register value.

12. The display device according to claim 11, wherein the register value corresponds to the vertical resolution of the image.

13. A method of operating a display driver comprising a plurality of memory regions, each of the plurality of memory regions configured to store image data for one line of an image displayed in a frame, the method comprising:
adjusting a number of in-use memo regions of the plurality of memory regions that are used to store the image data by dividing a vertical resolution of the image by one or more candidates and selecting candidate of the one or more candidates corresponding to a largest remainder, wherein each of the one or more candidates is associated with a different number of the plurality of memory regions; and
controlling the memory regions so that image data for respective lines of the image are cyclically stored in the in-use memory regions in a fixed order.

14. The method according to claim 13, further comprising:
calculating remainders by dividing the vertical resolution of the image by the one or more candidates; and
selecting, based on the calculated remainders, the candidate corresponding to the largest remainder.

15. The method according to claim 14, wherein selecting the candidate corresponding to the largest remainder comprises
when none of the calculated remainders is 0, selecting the number of the in-use memory regions as one of the one or more candidates for which the calculated remainder is the largest.

16. The method according to claim 13, wherein a number of the plurality of memory regions is less than vertical resolution of the image.

17. The method according to claim 13, wherein adjusting the number of in-use memory regions further based on a register value.

18. The method according to claim 17, wherein the register value corresponds to the vertical resolution of the image.

* * * * *

UNITED STATES PATENT AND TRADEMARK OFFICE
CERTIFICATE OF CORRECTION

PATENT NO. : 10,643,515 B2  
APPLICATION NO. : 16/137119  
DATED : May 5, 2020  
INVENTOR(S) : Kentaro Suzuki et al.

Page 1 of 1

It is certified that error appears in the above-identified patent and that said Letters Patent is hereby corrected as shown below:

In the Claims

Claim 7, Column 14, Line 1, delete "comprising;" and insert -- comprising: --, therefor.

Claim 7, Column 14, Line 16, after "of the" insert -- plurality --.

Claim 7, Column 14, Line 18, delete "stored r" and insert -- stored in --, therefor.

Claim 8, Column 14, Line 24, after "image" delete "is".

Claim 11, Column 14, Line 42, delete "memory," and insert -- memory --, therefor.

Claim 13, Column 14, Line 51, delete "memo" and insert -- memory --, therefor.

Claim 13, Column 14, Line 54, after "selecting" insert -- a --.

Claim 15, Column 15, Line 2-3, delete "comprises" and insert -- comprises: --, therefor.

Claim 17, Column 15, Line 12, after "regions" insert -- is --.

Signed and Sealed this  
Sixth Day of October, 2020

Andrei Iancu  
*Director of the United States Patent and Trademark Office*